(No Model.)
E. B. MANNING & M. SEIPS.
ATTACHMENT OF COVERS TO TEA OR COFFEE POTS OR OTHER VESSELS.
No. 488,793. Patented Dec. 27, 1892.
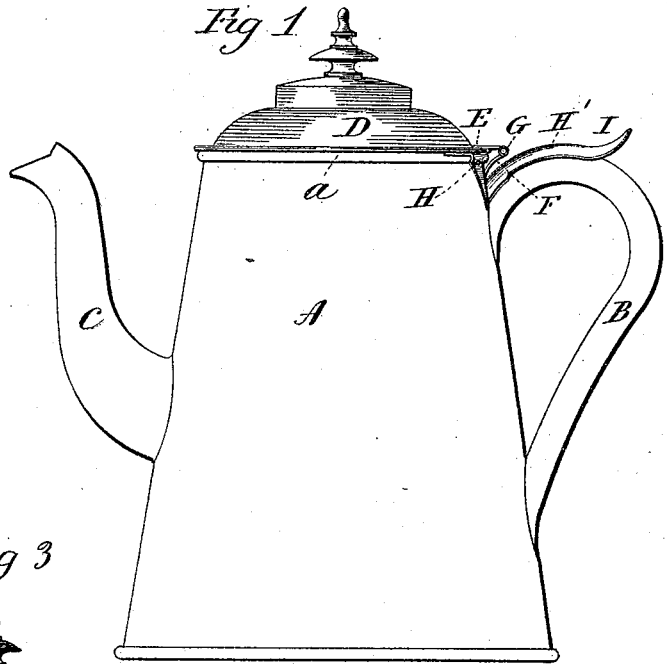
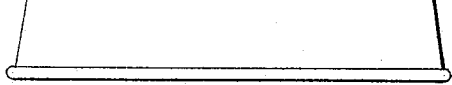
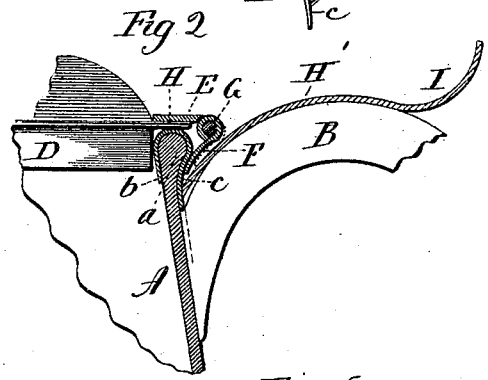
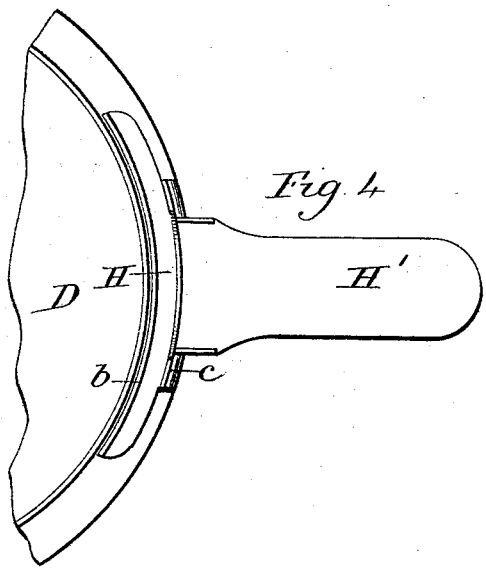
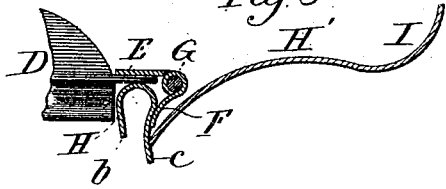

UNITED STATES PATENT OFFICE.

EDWARD B. MANNING AND MICHAEL SEIPS, OF MERIDEN, CONNECTICUT, ASSIGNORS TO MANNING, BOWMAN & CO., OF SAME PLACE.

ATTACHMENT OF COVERS TO TEA OR COFFEE POTS OR OTHER VESSELS.

SPECIFICATION forming part of Letters Patent No. 488,793, dated December 27, 1892.

Application filed February 23, 1892. Serial No. 422,422. (No model.)

*To all whom it may concern:*

Be it known that we, EDWARD B. MANNING and MICHAEL SEIPS, of Meriden, in the county of New Haven and State of Connecticut, have invented a new Improvement in the Attachment of Covers to Tea or Coffee Pots or other Vessels; and we do hereby declare the following, when taken in connection with accompanying drawings and the letters of reference marked thereon, to be a full, clear, and exact description of the same, and which said drawings constitute part of this specification, and represent, in—

Figure 1, a side view of a tea or coffee-pot showing the invention applied thereto. Fig. 2, a vertical central section through a portion of the cover, body and handle at the hinge, enlarged. Fig. 3, a side view of the cover, clasp, hinge and thumb-piece detached from the pot. Fig. 4, an under side view of a portion of the cover, the clasp and thumb-piece detached. Fig. 5, a vertical section through the clasp, hinge and thumb-piece detached.

This invention relates to an improvement in the construction of that class of tea or coffee-pots and other vessels in which the body of the vessel is made from metal, and coated with a vitreous glazing, substantially such as known in the market as "granite ware," the invention however is applicable to vessels without such glazing. The covers of these pots are usually made from metal not glazed, and it is desirable to hinge the cover to the vessel. To do this, either the hinge must be attached before the glazing operation, or the connection between the hinge and body must be made after glazing; in the first case a serious difficulty is experienced in making a nice job, and in the latter case the attachment is expensive and liable to the objection that the removal of the glazing to a greater or less extent exposes the metal to oxidation or rusting. Other objections to this class of hinges, and difficulties in their attachment, to vessels which are so coated as well as to like vessels uncoated, are too well known to manufacturers of this class of ware to require particular description in this application.

The object of the present invention is to construct the hinge so that it may be readily applied after the pot is glazed and finished, and without making metallic contact with the pot, and also to make the hinge detachable from the pot, and the invention consists in the construction as hereinafter described and particularly recited in the claim.

In illustrating the invention it is shown only as applied to a tea or coffee-pot.

A, represents the tea or coffee-pot, provided with the handle B, and the spout C, in the usual manner. The upper edge of the pot is provided with the usual bead or wire for strengthening and supporting that edge of the pot, and the pot is glazed outside and in, such glazing also covering the bead so that the glazing extends from the inside out and over onto the outside, and so that no portion of the metal surface of the pot is exposed.

D, represents the cover, which in shape or design may be according to the requirement of the trade or taste of the manufacturer.

E, represents one part or leaf of the hinge, which is attached to the cover, and F, represents the other part or leaf of the hinge, the two being united by a pintle G, in the usual manner. To attach the leaf F of the hinge to the pot, a metal clasp H, is constructed, which is of segment shape, its curve corresponding to the curve of the upper edge of the pot, as seen in Fig. 4. The metal from which the clasp is made is doubled to form two legs $b\ c$, see Figs. 2 and 5, and at the bend the interior of these legs corresponds to the shape of the bead $a$, as seen in Fig. 2, but below the bead the two legs are drawn together, so as to be considerably nearer together than the diameter of the bead. This clasp is applied by introducing the leg $b$, to the inside of the pot and the leg $c$, over the outside of the pot, the metal yielding to pass over the bead, and so that the clasp may be pressed down onto the bead, the leg inside lying close upon the inner surface of the pot and the leg $c$ close upon the outer surface of the pot below the bead, and so that the bead is firmly embraced by the clasp.

The leaf F, of the hinge is permanently attached to or made as a part of the clasp, as seen in Figs. 2 and 5. The clasp is of a length to embrace a considerable extent of length of the bead and surface of the pot, so as to make the clasping engagement firm and secure. After the pot is completed, the cover having been hinged to the clasp, the clasp is set on over the edge of the pot and forced down over and so as to embrace the bead and engage the body of the pot below, the legs yielding for such application of the cover, and when applied, the cover operates in the usual manner, that is the same as if the hinge was attached directly to the metal of the pot. Whenever it is desirable, the cover may be removed by simply applying sufficient force to withdraw the clasp from its engagement with the pot. By this construction the covers may be made in stock, and of different designs, and the pots also made in stock without covers, the covers being applied according to the style and requirements of the orders for the goods, the covers in many cases being the only distinguishing characteristic of one pot from another.

Instead of making the hinged connection by a leaf permanently attached to the clasp, it will be so evident to those skilled in the art that that leaf may be made an integral part of the clasp, that an illustration of such construction is unnecessary.

In using a pot of this character a thumb-piece on the handle is desirable, and this is usually made by constructing the handle with a protuberance of some character, in a convenient position for the thumb, but in case of handles to be glazed, this is difficult to produce. To avoid this difficulty, and yet provide a thumb-piece which may serve all practical purposes for which the thumb-piece is desired, a metallic plate H', is made, corresponding in shape to the shape of the handle from the pot outward to the position where the thumb-piece is required, and the end of the plate is turned upward as at I, Fig. 2, the plate presenting a rounded surface for the convenient application of the thumb. The leaf F of the hinge may be attached directly to the plate H, if preferred, as indicated in broken lines Fig. 2.

Preferably the plate H', is attached to or made as a part of the clasp, as seen in Fig. 2, but it may be made separate, as seen in Fig. 6, and attached directly to the pot by means of solder or otherwise, represented in Fig. 6 as by soldering through one or more openings $d$ formed in the plate, the glazing on the handle at such openings will be removed, so that metallic contact may be attained.

This invention has been thus far described as applied to tea or coffee-pots, but it will be understood that the covers may be applied to other glazed vessels in like manner and with substantially the same advantages.

We do not claim broadly a cover having its hinge provided with a clasp and so that the clasp may be set over the handle and make engagement therewith, whereby the cover with its hinge is removable at pleasure.

We claim.

In a tea or coffee-pot provided with a handle, and having a bead around the edge of the pot, the combination therewith of a removable metal clasp, the metal bent to form two legs adapted to set over the bead on the edge of the pot, and embrace the body below the bead, a plate attached to or made as a part of said clasp and extending over the top of the handle, and its end turned up to form a thumb-piece, with a cover and a hinge between the cover and the clasp, substantially as described, and whereby the said clasp, thumb-piece, cover and hinge are removably attached to the pot.

In testimony whereof we have signed this specification in the presence of two subscribing witnesses.

EDWARD B. MANNING.
MICHAEL SEIPS.

Witnesses:
EDWARD J. POOLEY,
GEORGE R. DIMOCK.